United States Patent
Daly

(10) Patent No.: US 10,724,565 B2
(45) Date of Patent: Jul. 28, 2020

(54) TOGGLE FIXING

(71) Applicant: fischerwerke GmbH & Co. KG, Waldachtal (DE)

(72) Inventor: Aaron Daly, Pfalzgrafenweiler (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 318 days.

(21) Appl. No.: 15/754,280

(22) PCT Filed: Sep. 12, 2016

(86) PCT No.: PCT/EP2016/071427
§ 371 (c)(1),
(2) Date: Feb. 21, 2018

(87) PCT Pub. No.: WO2017/055060
PCT Pub. Date: Apr. 6, 2017

(65) Prior Publication Data
US 2018/0252250 A1 Sep. 6, 2018

(30) Foreign Application Priority Data
Sep. 29, 2015 (DE) .......... 10 2015 116 422

(51) Int. Cl.
*F16B 13/08* (2006.01)

(52) U.S. Cl.
CPC .......... *F16B 13/0808* (2013.01); *F16B 13/08* (2013.01)

(58) Field of Classification Search
CPC .................. F16B 13/0808; F16B 13/08
USPC .......................... 411/340, 344, 345
See application file for complete search history.

(56) References Cited

U.S. PATENT DOCUMENTS

| | | | |
|---|---|---|---|
| 1,738,133 A | 12/1929 | Anderson | |
| 3,211,042 A * | 10/1965 | Artur | F16B 13/0808 411/344 |
| 4,286,497 A | 9/1981 | Shamah | |
| 4,294,156 A | 10/1981 | McSherry | |
| 4,865,501 A * | 9/1989 | Ferris | F16B 13/0808 411/340 |
| 6,821,069 B2 * | 11/2004 | Ikuta | F16B 13/0808 411/340 |
| D829,085 S * | 9/2018 | Daly | D8/382 |
| 10,465,729 B2 * | 11/2019 | Daly | F16B 13/0808 |
| 2002/0154964 A1 | 10/2002 | Ikuta | |

(Continued)

FOREIGN PATENT DOCUMENTS

| | | |
|---|---|---|
| CA | 2 502 044 A1 | 9/2006 |
| DE | 1 121 792 A | 1/1962 |

(Continued)

OTHER PUBLICATIONS

Search Report for related German Patent Application No. 10 2015 116 424.8, dated Jun. 9, 2016.

(Continued)

*Primary Examiner* — Roberta S Delisle
(74) *Attorney, Agent, or Firm* — Renner, Otto, Boisselle & Sklar, LLP

(57) ABSTRACT

A toggle fixing having a crosspiece and a strip which is pivotally connected to the crosspiece via a flexible portion. The crosspiece is formed with a detent with which the crosspiece, on insertion through a through-hole in a plasterboard panel, is supported against a toothing of the strip.

11 Claims, 3 Drawing Sheets

(56) References Cited

U.S. PATENT DOCUMENTS

| | | | |
|---|---|---|---|
| 2003/0118420 A1 | 6/2003 | Ikuta | |
| 2006/0088399 A1 | 4/2006 | Demeo | |
| 2008/0206014 A1* | 8/2008 | Lemire | F16B 13/0808 |
| | | | 411/344 |
| 2008/0253860 A1 | 10/2008 | McDuff | |
| 2009/0208310 A1* | 8/2009 | Ikuta | F16B 13/0808 |
| | | | 411/344 |
| 2017/0314600 A1* | 11/2017 | Daly | F16B 13/0808 |
| 2018/0372139 A1* | 12/2018 | Daly | F16B 13/0808 |
| 2019/0107136 A1* | 4/2019 | Daly | F16B 13/0808 |

FOREIGN PATENT DOCUMENTS

| | | |
|---|---|---|
| DE | 296 18 192 U1 | 2/1997 |
| DE | 696 08 596 T2 | 10/2000 |
| FR | 2 175 511 A5 | 10/1973 |
| WO | 80/00734 A1 | 4/1980 |

OTHER PUBLICATIONS

IPRP (PCT/IPEA/409) for corresponding International Application PCT/EP2016/071427, dated Aug. 31, 2017.
International Search Report (with English Translation) and Written Opinion for corresponding International Application PCT/EP2016/071427, dated Dec. 13, 2016.

* cited by examiner

TOGGLE FIXING

TECHNICAL FIELD OF INVENTION

The invention relates to a toggle fixing having the features described herein.

DISCUSSION OF RELATED ART

Toggle fixings are used for fixing to panels, typically to plasterboard panels, that are mounted on an underside of a ceiling. The toggle fixing is fixed through a hole in the panel by resting on the rear side of the panel. For the fixing, the rear side of the panel need not be accessible. For example, it is also possible to fix a toggle fixing to a perforated brick.

Patent DE 1 121 792 discloses such a toggle fixing, which has a crosspiece with a screw hole and a strip pivotally connected to the crosspiece. The screw hole serves for screwing in a screw transversely with respect to the crosspiece. The strip serves for handling the toggle fixing while it is being fixed. The strip is arranged on a periphery of the screw hole. To insert the crosspiece through a through-hole, the crosspiece is pivoted so that the strip is located longitudinally along a side of the crosspiece. In that position the crosspiece can be inserted through the through-hole with the aid of the strip. Once the crosspiece has passed through the through-hole, it is pulled back with the aid of the strip, so that it assumes a transverse position on a rear side of the hole and engages behind a rim of the hole. A screw can then be screwed through the through-hole into the screw hole of the crosspiece of the toggle fixing, the crosspiece being held in place by pulling on the strip.

If a force for inserting the crosspiece through a through-hole is high, the strip can become distorted or buckled.

SUMMARY OF THE INVENTION

The problem of the invention is to reduce the risk of the strip bending or buckling when the crosspiece of a toggle fixing is inserted through a through-hole.

The toggle fixing according to the invention has a crosspiece having a screw hole for screwing in a screw transversely with respect to the crosspiece. The invention uses the term "crosspiece" to denote an elongate component which extends along a longitudinal axis and which, in a longitudinal direction, is longer along the longitudinal axis than transversely with respect to the longitudinal direction, so that it can be inserted in its longitudinal direction through a through-hole and engages over or behind the rim of a hole once it has been positioned transversely with respect to the through-hole. "Transversely with respect to the crosspiece" does not necessarily mean that a screwed-in screw is at a right-angle to the longitudinal axis of the crosspiece and/or the screw hole runs at a right-angle to the longitudinal axis of the crosspiece; an oblique position of the screw is also to be thought of as "transverse" within the meaning of the invention, at least if the screw is at an obtuse angle with respect to the crosspiece.

The strip is a thin, elongated and preferably straight component which can be located next to a screw in the through-hole and which is sufficiently rigid that it can be used to insert the crosspiece through the through-hole. The strip can also be though of as being, for example, a stem or shank.

The strip and the crosspiece are pivotally connected; they are preferably in one piece and consist, for example, of plastics. For the pivotal connection, the strip can, for example, be connected to the crosspiece by a joint and/or can be flexible; if the strip and the crosspiece are in one piece, the strip is especially flexible for the pivotal connection to the crosspiece, it being sufficient for the strip to be flexible in a flexible portion preferably at or close to the crosspiece. The strip can otherwise be rigid or resistant to bending or at least more resistant to bending than in the flexible portion.

According to the invention, the strip has a counter-bearing for the crosspiece, against which the crosspiece is supported in a pushing direction once the strip has been pivoted into a position longitudinal with respect to the crosspiece and at the side of the crosspiece, which is equivalent to pivoting the crosspiece into a position longitudinal with respect to the strip, in which the strip is located at the side of the crosspiece. The pushing direction is the direction in which the crosspiece is inserted through a through-hole with the aid of the strip. The support of the crosspiece on the counter-bearing reduces a free length of the strip between a location at which the strip is grasped manually during insertion through the through-hole and a location at which the pushing force is transmitted from the strip to the crosspiece and which is given by the counter-bearing in the case of the invention. The invention thus reduces the risk of the strip bending or buckling during insertion of the crosspiece through a through-hole. This is an advantage, especially in the event of a high insertion force, that is to say if the through-hole is narrow in relation to the crosspiece and the strip pivoted longitudinally along its side.

An embodiment of the invention provides as articulated connection a flexible portion of the strip in which the strip is less resistant to bending than outside the flexible portion. The flexible portion can be implemented, for example, by a reduction in cross-section. The counter-bearing, against which the crosspiece is supported in the pushing direction once the strip has been pivoted into the longitudinal direction of the crosspiece and to the side of the crosspiece, is in this embodiment of the invention located outside the flexible portion of the strip on a side of the flexible portion remote from the crosspiece. As a result, the flexible portion is relieved of the pushing force that is exerted on the crosspiece via the strip in order to insert the crosspiece through the through-hole. Bending or buckling of the strip in the flexible portion when the crosspiece is inserted through a through-hole is thus counteracted.

The counter-bearing can be a projection, lug, tooth or the like which projects laterally from the strip and against which the crosspiece is supported by one end once the strip has been pivoted in its longitudinal direction at its side. Conversely, it is also possible for a projection to project from the crosspiece, which projection engages in a recess of the strip or the like that forms the counter-bearing once the strip has been pivoted into the longitudinal direction of the crosspiece and to the side of the crosspiece. In an embodiment of the invention, the strip has a rack-like toothing on the side on which the crosspiece is located once the strip has been pivoted longitudinally with respect to the crosspiece at the side thereof. One or more teeth of the toothing form the counter-bearing. The toothing can at the same time serve for fixing the position of a sleeve for closing the through-hole once the toggle fixing has been fixed. The toothing is preferably sawtooth-shaped for that purpose, so that the sleeve is displaceable only in the direction towards the crosspiece of the toggle fixing, that is to say in the direction of the through-hole.

Preferably the strip supports an end of the crosspiece once the strip has been pivoted into the position longitudinal with respect to the crosspiece and to the side of the crosspiece. As a result, a length of the strip on which the strip is acted upon by a compressive force on insertion of the crosspiece through a through-hole is kept short, thus keeping the risk of the strip bending or buckling low.

An embodiment of the invention provides a detent on the crosspiece with which the crosspiece is supported against the counter-bearing once the strip has been pivoted longitudinally with respect to the crosspiece at the side thereof. The detent is in the form of, for example, a protruding rib or in the form of a sawtooth and is complementary to the toothing on the strip and effects good support of the crosspiece against the strip during insertion through a through-hole. It is also possible for there to be present on the crosspiece a plurality of detents which co-operate with a plurality of teeth of the toothing of the strip. However, a detent also allows counter-bearings other than teeth, for example a hole in the strip into which the detent enters when the strip is pivoted longitudinally with respect to the crosspiece at the side thereof. In that case the detent can have, for example, the shape of a peg.

BRIEF DESCRIPTION OF THE DRAWINGS

The invention is explained in greater detail below with reference to an exemplary embodiment shown in the drawing, wherein.

DETAILED DESCRIPTION OF THE INVENTION

Figure 1:
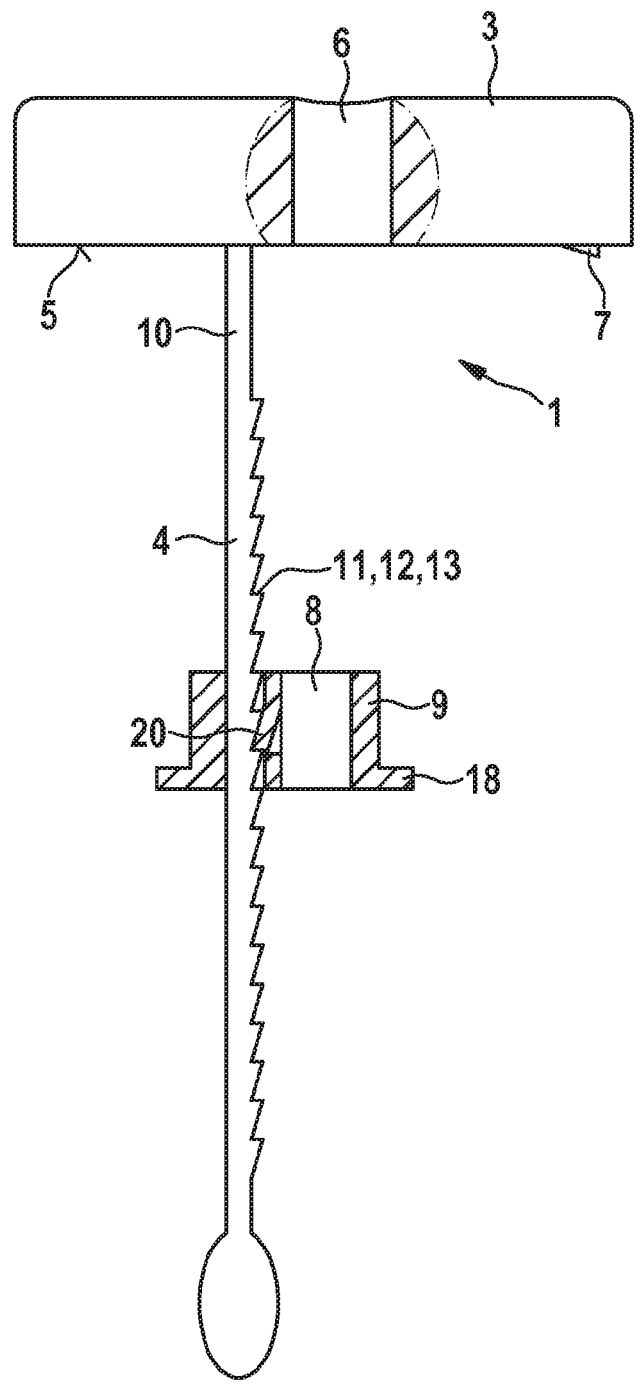
FIG. 1 is a side view of a toggle fixing according to the invention.

The toggle fixing 1 according to the invention shown in FIG. 1 serves for fixing an article (not shown) especially to a panel such as, for example, a plasterboard panel 2, one side of which, referred to herein as the rear side 17, is inaccessible or at least need not be accessible. The toggle fixing 1 has a crosspiece 3 and a strip 4 which is in one piece with the crosspiece 3. In the exemplary embodiment, the crosspiece 3 is a cylinder having a flattened side 5 on which the strip 4 is arranged. The crosspiece 3 has a circular-segment-shaped cross-section which occupies more than a semicircle. The cross-section of the crosspiece 3 is shown in FIG. 1. Other shapes of crosspiece 3 are possible; what is necessary is that, together with the laterally applied strip 4, it can be inserted in its longitudinal direction through a through-hole 14 and, when oriented transversely with respect to the through-hole 14, engages over a rim of the through-hole 14 at two opposite locations, that is to say it is longer than a diameter of the through-hole 14.

In a centre the crosspiece 3 has a screw hole 6 which passes radially through the crosspiece 3. The screw hole 6 opens orthogonally in the flattened side 5 of the crosspiece 3. In the exemplary embodiment, the screw hole 6 is threadless and is intended for screwing in a self-cutting screw (not shown), for example a wood screw. A screw hole 6 having an internal thread (not shown) is also possible, however.

At one end the crosspiece 3 has on its flattened side 5 a sawtooth-shaped detent 7. It is also possible for a plurality of detents 7 to be present and/or for the detent 7 to have a different shape and/or it can—other than shown in the drawing—be resilient. The strip 4 projects close to a periphery of the screw hole 6 on a side of the flattened side 5 of the crosspiece 3 located opposite the detent 7. A distance of the strip 4 from the screw hole 6 is chosen so that a through-hole 8 of a sleeve 9, which is displaceably guided on the strip 4, is in alignment with the screw hole 6.

Figure 2:
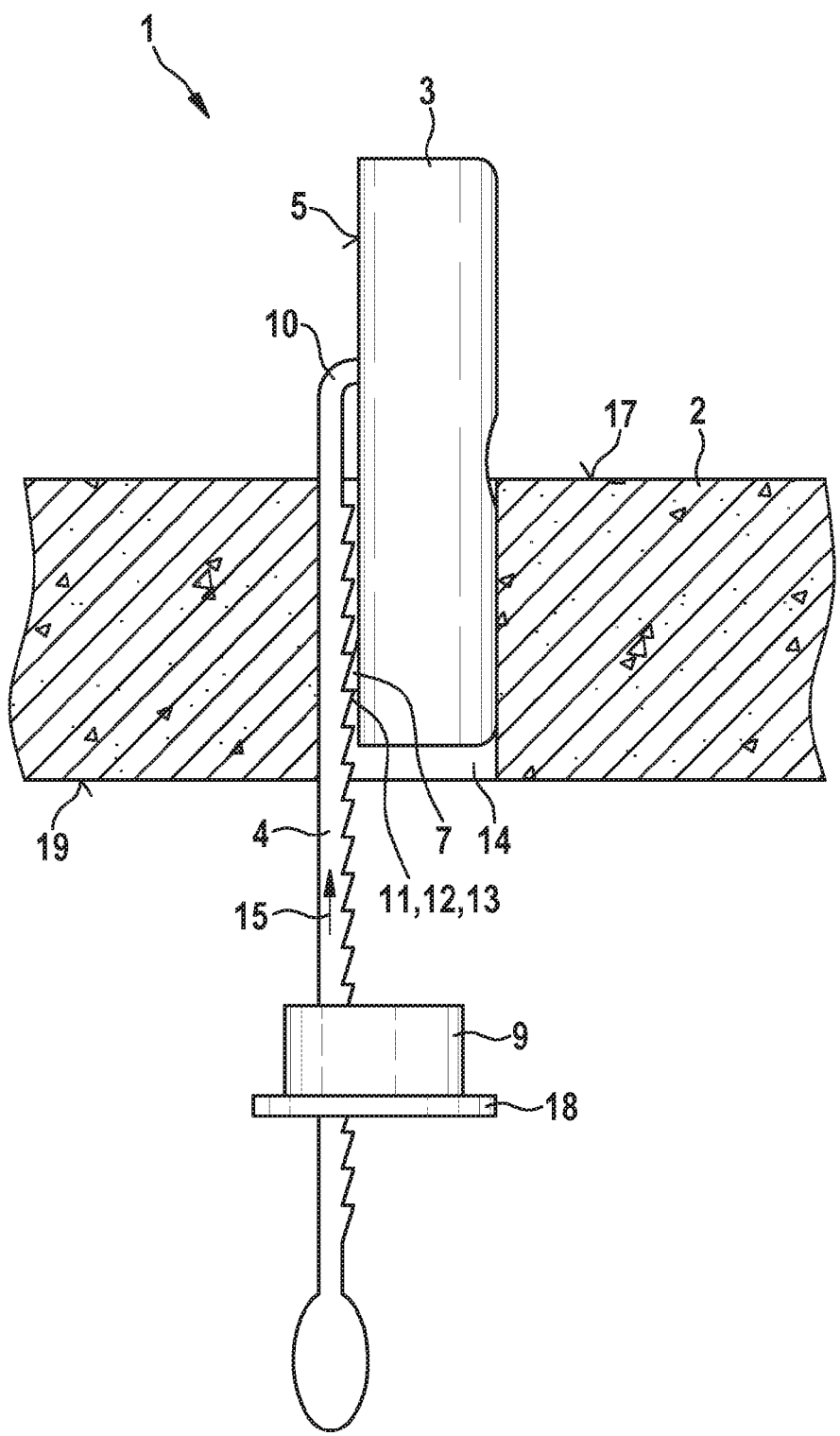
FIG. 2 shows the toggle fixing on insertion through a through-hole in a plasterboard panel.

At its crosspiece-side end the strip 4 has, as flexible portion 10, a portion of reduced cross-section by means of which the strip 4 is pivotally connected to the crosspiece 3. The strip is able to pivot from a position shown in FIG. 1, in which it projects orthogonally from the flattened side 5 of the crosspiece 3, into a position in which it rests against the flattened side 5, which position is shown in FIG. 2, or conversely the crosspiece 3 is able to pivot so that its flattened side 5 rests against the strip 4. The strip 4 then covers the screw hole 6 and the detent 7. In the position in which it has been pivoted onto the flattened side 5 of the crosspiece 3, the strip 4 is located longitudinally, i.e. parallel, with respect to the crosspiece 3 at one side, in this case the flattened side 5, thereof.

As mentioned, the strip 4 and the crosspiece 3 have been produced in one piece, for example by injection-moulding from plastics.

Adjoining the flexible portion 10 on the side of the flexible portion 10 remote from the crosspiece 3, the strip 4 has a larger cross-section and is at that location likewise flexible, but more resistant to bending than in the flexible portion 10.

Outside the flexible portion 10, the strip 4 has a toothing 11 in the manner of a rack having teeth 12 which, in the exemplary embodiment, are sawtooth-shaped. When the strip 4 is pivoted against the flattened side 5 of the crosspiece 3, as can be seen in FIG. 2, the detent 7 at one end of the crosspiece 3 enters into engagement with one of the teeth 12 of the toothing 11 of the strip 4. The tooth 12 forms a counter-bearing 13, against which the crosspiece 3 is supported in a pushing direction 15 by way of its detent 7.

For fixing to, for example, the plasterboard panel 3, the strip 4 is bent in the flexible portion 10 and pivoted relative to the crosspiece 3 so that it covers the screw hole 6 and rests against the flattened side 5 of the crosspiece 3. The detent 7 of the crosspiece 3 enters into engagement with the toothing 11 of the strip 4 and is supported in the pushing direction 15 against one of the teeth 12 of the toothing 11, which is referred to herein as counter-bearing 13. In this position of the strip 4, in which it has been pivoted against the flattened side 5 of the crosspiece 3, the crosspiece 3 is pushed in its longitudinal direction through a through-hole 14 in the plasterboard panel 2, as can be seen in FIG. 2. For pushing the crosspiece 3 through the through-hole 14 of the plasterboard panel 2, the toggle fixing 1 is held with the aid of the strip 4 and a pushing force is exerted on the strip 4 in the pushing direction 15, which is the direction of insertion through the through-hole 14 in the plasterboard panel 2. The pushing force for inserting the crosspiece 3, together with the strip 4 resting against its flattened side 5, through the through-hole 14 in the plasterboard panel 2 is transmitted to the detent 7 of the crosspiece 3 via the tooth 12 of the toothing 11 of the strip 4 forming the counter-bearing 13, so that the less bending-resistant flexible portion 10 of the strip 4 is relieved of load. As a result, the crosspiece 3 with the strip 4 resting against its flattened side 5 can also be inserted through a narrow through-hole 14, without the strip 4 bending or buckling. The term "strip" does not mean that the strip 4 is limp, but rather it is resilient and, outside the flexible portion 10, exhibits a bending resistance which allows the exertion of a pushing force sufficient for inserting the crosspiece 3 with the strip 4 resting against its flattened side 5 even through a narrow through-hole 14, without the strip 4 bending or buckling.

Figure 3:
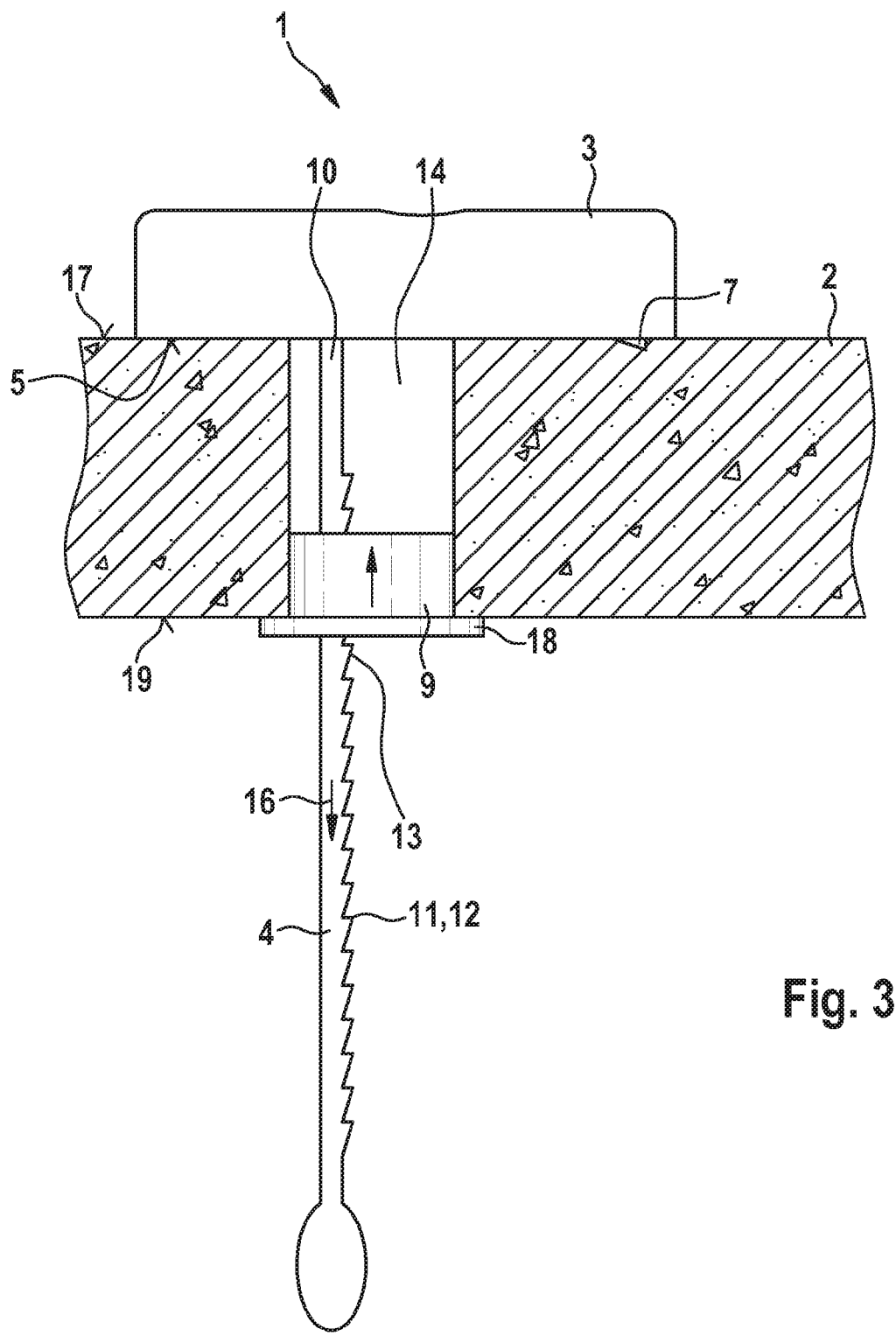
FIG. 3 shows the toggle fixing from FIGS. 1 and 2 in a state in which it is fixed to the plasterboard panel.

Once the crosspiece 3 has passed through the through-hole 14 in the plasterboard panel 2, as a result of an elasticity of the flexible portion 10 of the strip 4 it assumes a position transverse or at least oblique with respect to the strip 4. Using the strip 4, the crosspiece 3 is pulled back in the direction of arrow 16, so that it rests against a rear side 17 of the plasterboard panel 2, as can be seen in FIG. 3. While a tensile force is maintained on the strip 4, which force holds the crosspiece 3 in contact with the rear side 17 of the plasterboard panel 2, the sleeve 9 is displaced on the strip 4 in the direction of the crosspiece 3, so that it passes into the through-hole 14 of the plasterboard panel 2. The sleeve 9 has a flange 18 which comes to rest against a front side 19 of the plasterboard panel 2 located opposite the rear side 17. The sleeve 9 has a resilient tongue as locking catch 20, which can be seen in FIG. 1 and which co-operates with the teeth 12 of the rack-like toothing 11 of the strip 4 in the manner of a pawl. Therefore only displacement of the sleeve 9 in the direction of the crosspiece 3 is possible; displacement in the opposite direction is prevented by the locking catch 20 of the sleeve 9 co-operating with the toothing 11. As a result, the crosspiece 3 can be clamped against the rear side 17 of the plasterboard panel 2 by means of the sleeve 9 via the strip 4, so that once the strip 4 has been cut off flush with the flange 18 of the sleeve 9, a screw (not shown in the drawing) can be inserted through the through-hole 8 of the sleeve 9 and screwed into the screw hole 6 of the crosspiece 3 which is in alignment with the through-hole 8 of the sleeve 9. Using the screw (not shown in the drawing) screwed into the screw hole 6 of the crosspiece 3, which is clamped against the rear side 17 of the plasterboard panel 2, an article (not shown in the drawing) can be fixed to the plasterboard panel 2.

LIST OF REFERENCE SYMBOLS

Toggle Fixing 1 toggle fixing
2 plasterboard panel
3 crosspiece
4 strip
5 flattened side of the crosspiece 3
6 screw hole of the crosspiece 3
7 detent
8 through-hole of the sleeve 9
9 sleeve
10 flexible portion
11 toothing
12 tooth
13 counter-bearing
14 through-hole of the plasterboard panel 2
15 pushing direction
16 arrow
17 rear side of the plasterboard panel 2
18 flange of the sleeve 9
19 front side of the plasterboard panel 2
20 locking catch

The invention claimed is:

1. A toggle fixing for fixing to a panel, having a crosspiece which has a screw hole for screwing in a screw transversely with respect to the crosspiece, and having a strip pivotally connected to the crosspiece for handling the toggle fixing during fixing, which strip is pivotable into a position in which it projects from the crosspiece and into a position longitudinal with respect to the crosspiece and at a side of the crosspiece, and including a counter-bearing on the strip, against which the crosspiece is supported in a pushing direction of the strip once the strip has been pivoted into the position longitudinal with respect to the crosspiece at the side of the crosspiece.

2. The toggle fixing according to claim 1, wherein the strip has a flexible portion as articulated connection to the crosspiece, and the strip is more resistant to bending outside the flexible portion than in the flexible portion, and the counter-bearing is located on the strip outside the flexible portion on a side of the flexible portion remote from the crosspiece.

3. The toggle fixing according to claim 1, wherein the crosspiece and the strip are in one piece.

4. The toggle fixing according to claim 1, wherein the strip has a rack with toothing on a side that faces towards the crosspiece once the strip has been pivoted into the position longitudinal with respect to the crosspiece to the side of the crosspiece, and one or more teeth of the toothing form the counter-bearing.

5. The toggle fixing according to claim 4, wherein a sleeve having a through-hole for a screw is displaceable on the strip, which sleeve co-operates with the toothing of the strip in the manner of a pawl, so that the sleeve is displaceable on the strip only in the direction of the crosspiece.

6. The toggle fixing according to claim 1, wherein an end of the crosspiece is supported against the counter-bearing once the strip has been pivoted into the position longitudinal with respect to the crosspiece at the side of the crosspiece.

7. The toggle fixing according to claim 1, wherein the crosspiece has a detent with which the crosspiece is supported against the counter-bearing once the strip has been pivoted into the position longitudinal with respect to the crosspiece to the side of the crosspiece.

8. The toggle fixing according to claim 1, wherein the side of the crosspiece and the counter-bearing are engageable via complementary mating surfaces.

9. The toggle fixing according to claim 1, wherein the side of the crosspiece and the counter-bearing are engageable via mating surfaces that engage each other in the pushing direction.

10. The toggle fixing according to claim 1, wherein the side of the crosspiece is parallel with the strip when the strip is moved in the pushing direction.

11. The toggle fixing according to claim 1, wherein the strip is resilient outside the flexible portion whereby the strip rests against the crosspiece against the crosspiece during movement of the strip in the pushing direction.

* * * * *